(12) United States Patent
Weidman et al.

(10) Patent No.: US 9,186,763 B2
(45) Date of Patent: Nov. 17, 2015

(54) MODULAR MACHINE TOOLS

(75) Inventors: Darren Paul Weidman, Sherwood, OR (US); Hitesh K. Patel, Tigard, OR (US); John Winfrey Dillman, Newberg, OR (US); Garrett Lindon Headrick, Newberg, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 1132 days.

(21) Appl. No.: 13/209,246

(22) Filed: Aug. 12, 2011

(65) Prior Publication Data

US 2013/0039713 A1 Feb. 14, 2013

(51) Int. Cl.
| | |
|---|---|
| *B23Q 37/00* | (2006.01) |
| *B23Q 1/01* | (2006.01) |
| *B23C 1/06* | (2006.01) |
| *B23C 1/20* | (2006.01) |
| *B23C 1/08* | (2006.01) |
| *B23C 1/00* | (2006.01) |

(52) U.S. Cl.
CPC *B23Q 1/01* (2013.01); *B23Q 1/012* (2013.01); *B23Q 1/015* (2013.01); *B23Q 37/002* (2013.01); *B23Q 37/005* (2013.01); *B23C 1/002* (2013.01); *B23C 1/06* (2013.01); *B23C 1/08* (2013.01); *B23C 1/20* (2013.01); *Y10T 29/50* (2015.01); *Y10T 409/306384* (2015.01); *Y10T 409/307168* (2015.01); *Y10T 409/308288* (2015.01); *Y10T 409/309576* (2015.01)

(58) Field of Classification Search
CPC .... B23Q 37/005; B23Q 37/002; B23Q 37/00; Y10T 29/50

USPC .......................................................... 29/560
See application file for complete search history.

(56) References Cited

U.S. PATENT DOCUMENTS

| | | | |
|---|---|---|---|
| 2,660,096 A | 11/1953 | Morton | |
| 3,780,619 A | 12/1973 | Kitamura et al. | |
| 3,867,054 A * | 2/1975 | Muller | 29/560 |
| 3,983,776 A | 10/1976 | Flanders | |
| 4,022,106 A | 5/1977 | Kile | |
| 4,080,692 A | 3/1978 | Parrillo et al. | |
| 4,297,061 A | 10/1981 | Wolfe et al. | |

(Continued)

FOREIGN PATENT DOCUMENTS

| | | |
|---|---|---|
| CA | 2250824 | 9/1998 |
| CN | 200985628 | 12/2007 |

(Continued)

OTHER PUBLICATIONS

Translation of JP 63-147201-U, which JP '201 was published Sep. 1988.*

(Continued)

*Primary Examiner* — Erica E Cadugan
(74) *Attorney, Agent, or Firm* — DASCENZO Intellectual Property Law, P.C.

(57) ABSTRACT

Modular machine tools, modular machine-tool beds, and systems for assembling the same are disclosed. Some machine tools and beds may be configured selectively between a cantilever configuration and a gantry configuration. Some modular beds may be assembled selectively to have a desired longitudinal length. The modular nature of the machine tools and modular beds allows users to configure a machine tool in multiple configurations depending on a particular work piece needing to be worked.

11 Claims, 5 Drawing Sheets

(56) References Cited

U.S. PATENT DOCUMENTS

| | | | |
|---|---|---|---|
| 4,599,018 A | 7/1986 | Woods | |
| 5,106,243 A | 4/1992 | Hunt | |
| 5,186,087 A * | 2/1993 | McCormack | 82/142 |
| 5,297,907 A | 3/1994 | Strait et al. | |
| 5,375,951 A | 12/1994 | Veale | |
| 5,375,952 A | 12/1994 | Line | |
| 5,562,043 A | 10/1996 | Gromes | |
| 5,697,413 A * | 12/1997 | Fuller | 409/178 |
| 5,848,458 A | 12/1998 | Bullen | |
| 6,019,514 A | 2/2000 | Feinstein | |
| 6,161,995 A | 12/2000 | Wakazono et al. | |
| 6,467,385 B1 | 10/2002 | Buttrick et al. | |
| 6,494,307 B1 | 12/2002 | Kozak et al. | |
| 6,712,061 B1 | 3/2004 | Kalb | |
| 6,843,328 B2 | 1/2005 | Boyl-Davis et al. | |
| 6,926,094 B2 | 8/2005 | Arntson et al. | |
| 6,966,731 B2 | 11/2005 | VanderPol et al. | |
| 6,997,175 B2 | 2/2006 | Kalb | |
| 7,137,760 B2 | 11/2006 | Boyl-Davis et al. | |
| 7,165,630 B2 | 1/2007 | Arnston et al. | |
| 7,216,408 B2 | 5/2007 | Boyl-Davis et al. | |
| 7,264,426 B2 | 9/2007 | Buttrick, Jr. | |
| 7,273,333 B2 | 9/2007 | Buttrick, Jr. et al. | |
| 7,430,792 B2 | 10/2008 | Linnemann et al. | |
| 7,488,144 B2 | 2/2009 | Boyl-Davis et al. | |
| 7,621,206 B2 * | 11/2009 | Makropoulos | 29/560 |
| 7,632,047 B2 | 12/2009 | Buttrick, Jr. et al. | |
| 7,673,662 B2 | 3/2010 | Owen | |
| 7,677,181 B2 | 3/2010 | Boyl-Davis et al. | |
| 7,758,244 B2 | 7/2010 | Bauer | |
| 2013/0181108 A1 * | 7/2013 | Koepf | 248/676 |

FOREIGN PATENT DOCUMENTS

| | | |
|---|---|---|
| CN | 201357335 | 12/2009 |
| ES | 2264850 | 1/2007 |
| JP | 63-147201 U * | 9/1988 |

OTHER PUBLICATIONS

English-language abstract of Chinese patent document No. CN 200985628, 2007.

English-language abstract of Spanish patent document No. ES 2264850, 2007.

English-language abstract of Chinese patent document No. CN 201357335, 2009.

* cited by examiner

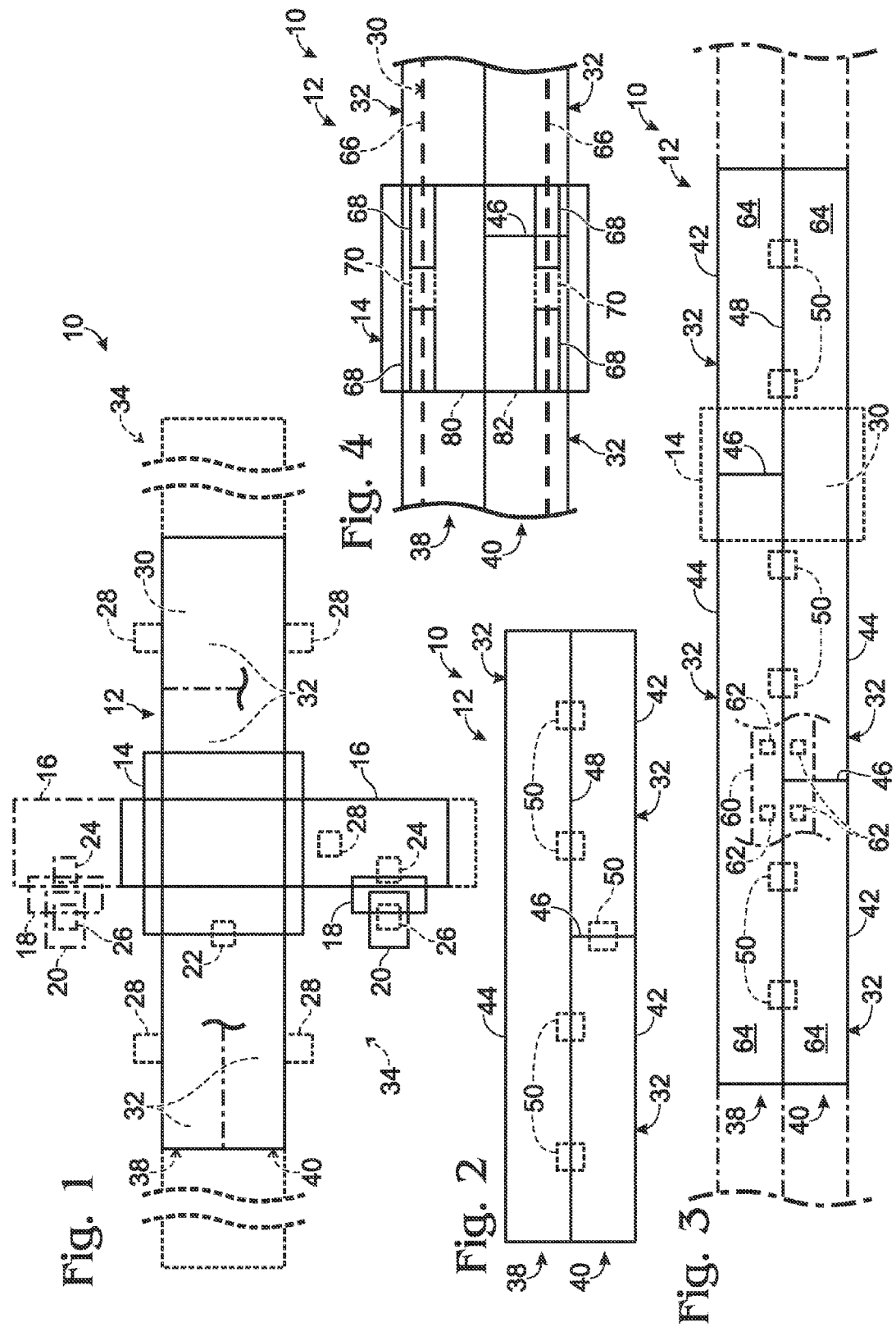

MODULAR MACHINE TOOLS

FIELD

The present disclosure relates to machine tools.

BACKGROUND

Machine tools generally fall within a class of tools that are used to machine, or modify, a part in a controlled and desired manner. The machining of a part also may be referred to as the working of a part, which may be referred to as a work piece. Machine tools may be configured to work metal parts, or parts of any suitable material. Parts may be manufactured using a machine tool, or parts simply may be modified (e.g., fixed) using a machine tool. Illustrative, non-exclusive examples of machine tools include (but are not limited to) mills, lathes, drill presses, and the like. Machine tools are often found in a machine shop, which may provide machining services for others. However, in many situations, it is not practical to transport a part needing to be machined to an offsite machine shop. For example, down time of machinery may be critical, the size and/or location of the part needing to be machined may not permit for easy removal, disassembly, transportation, etc. However, portable machine tools are a subclass of machine tools that are designed to be installed directly to, adjacent to, or at least near a work piece to efficiently fix parts, manufacture parts, etc., thereby avoiding significant down time for the machinery affected. Portable machine tools are used in various industries such as (but not limited to) wind power, ship-building, manufacturing, mining, military, power generation, etc. However, a given user of a portable machine tool may require various uses of a portable machine tool under variable constraints, such as size and space constraints at the installation site, the size and configuration of the work piece to be machined, etc.

SUMMARY

Modular machine tools, modular machine-tool beds, and systems for assembling modular machine tools and modular machine-tool beds are disclosed. Some modular machine-tool beds and modular machine tools according to the present disclosure may be configured selectively between a cantilever configuration and a gantry configuration. Some modular machine-tool beds according to the present disclosure may be assembled selectively to have a desired longitudinal length from a selection of more than one possible longitudinal length. The modular nature of the machine tools and the machine-tool beds of the present disclosure allows users to configure a machine tool in multiple configurations depending on a particular work piece needing to be worked.

BRIEF DESCRIPTION OF THE DRAWINGS

FIG. 1 is a schematic plan view illustration representing modular machine tools and modular linear machine-tool beds according to the present disclosure.

FIG. 2 is a schematic plan view illustration representing illustrative, non-exclusive examples of modular linear machine-tool beds according to the present disclosure.

FIG. 3 is another schematic plan view illustration representing illustrative, non-exclusive examples of modular linear machine-tool beds according to the present disclosure.

FIG. 4 is schematic fragmentary plan view illustration of a portion of illustrative, non-exclusive examples of modular linear machine-tool beds according to the present disclosure together with a schematic representation of illustrative, non-exclusive examples of a carriage of a modular machine tool according to the present disclosure.

DETAILED DESCRIPTION

Figure 5:
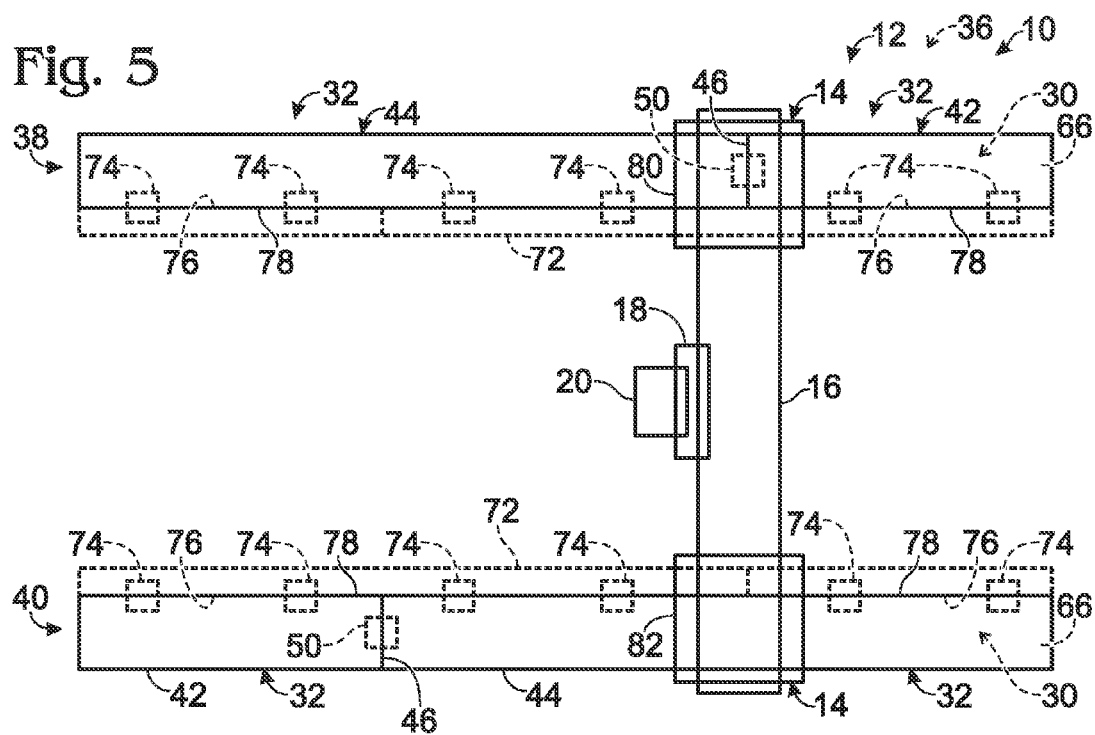
FIG. 5 is a schematic plan view illustration representing modular machine tools according to the present disclosure in a gantry configuration.

Modular machine tools and modular linear machine-tool beds according to the present disclosure are schematically illustrated in FIG. 1 and are generally indicated at 10 and 12, respectively. Also within the scope of the present disclosure are systems, or kits, that include a collection of components that are configured to be assembled to construct a machine tool 10 and/or a modular linear machine-tool bed 12 according to the present disclosure. The diagrams of FIGS. 1-5 are schematic in nature and are provided to broadly illustrate relative relationships between the illustrated structures, including optional structures and optional configurations of structures. FIGS. 1-5 are not intended to be to scale or to require the illustrated relationships in all embodiments of the present disclosure. Some structures in FIGS. 1-5 are depicted in broken (e.g., dashed or dash-dot) lines, with this presentation schematically indicating that the corresponding structure may be optional and/or may correspond to an optional embodiment or configuration of a modular machine tool 10 or component thereof; however, these schematic representations do not require that all structure shown in solid lines is required to all embodiments of modular machine tools 10, modular linear machine-tool beds 12, or components thereof according to the present disclosure.

Modular machine tools 10 according to the present disclosure may be described as portable machine tools and are generally configured to be installed directly to, adjacent to, or at least near a work piece needing to be machined; however, modular machine tools 10 are not limited to such uses and may be installed in a machine shop or other remote location relative to the work piece needing to be machined. Modular machine tools 10 additionally or alternatively may be referred to as linear machine tools 10, as machine tool assemblies 10, as linear machine tool assemblies 10, or simply as machine tools 10. As used herein, a linear machine tool is a machine tool that includes a linear bed that defines a straight track for linear longitudinal translation of a tool relative to the linear bed. A linear mill, or linear milling machine, is an example of a linear machine tool, because a linear milling machine is configured to translate a mill, or mill bit, in at least one linear direction, such as parallel to the longitudinal axis of the linear bed, and typically along at least three linear axes, such as according to an orthogonal coordinate system. However, machine tools according to the present disclosure may utilize and/or include any suitable tool, including (but not limited to) cutting tools, mills, drills, grinders, sanders, polishers, saws, cutters, routers, planers, etc.

As used herein, the indication of "longitudinal," such as referring to an axis, to a direction of translation, or to a relative relationship between two or more components, generally refers to the long axis, or dimension, of the respective component(s). In contrast, as used herein, the indication of "lateral," such as referring to a direction of translation or a relative relationship between two or more components, generally refers to the short axis, or dimension, of the respective component(s) and/or to an axis, dimension, or direction that is perpendicular to the longitudinal axis, direction, or translation.

As schematically illustrated in FIG. 1, machine tools 10 according to the present disclosure include at least a modular linear machine-tool bed 12, and also may include one or more of a ram-carriage 14 operatively coupled to the bed for selective longitudinal translation therealong, a ram 16 operatively coupled to and carried by the ram-carriage and extending perpendicular relative to the bed, a tool-carriage 18 operatively coupled to the ram for selective longitudinal translation therealong, and a tool 20 operatively coupled to and carried by the tool-carriage in a position to engage and work an adjacent work piece. Carriages additionally or alternatively may be referred to or described as skates, and rams additionally or alternatively may be referred to as beams. As used herein, "selective" and "selectively," when modifying an action, movement, configuration, or other activity of one or more components or characteristics of a machine tool according to the present disclosure, means that the specific action, movement, configuration, or other activity is a direct or indirect result of user manipulation of an aspect of, or one or more components of, the machine tool or component thereof.

Additional components that may be included in a machine tool 10 according to the present disclosure include (but are not limited to) a ram-carriage drive mechanism 22 operatively coupled between the bed and the ram-carriage to selectively drive, or translate, the ram-carriage longitudinally along the bed; a tool-carriage drive mechanism 24 operatively coupled between the ram and the tool-carriage to selectively drive, or translate, the tool-carriage longitudinally along the ram and perpendicular to the longitudinal axis of the bed; and a tool drive mechanism 26 operatively coupled between the tool and the tool-carriage to selectively drive, or translate, the tool transverse to the longitudinal axes of the ram and the bed. Accordingly, when all three optional drive mechanisms are present, a tool may be manipulated within an orthogonal coordinate system. Additionally or alternatively, one or both of the ram and the tool may be operatively and pivotally, or rotationally, coupled relative to the bed and the ram, respectively. Illustrative, non-exclusive examples of suitable drive mechanisms include (but are not limited to) ball screw mechanisms and rack-and-pinion mechanisms.

Additional optional components of machine tools 10 according to the present disclosure include (but are not limited to) one or more structures 28 configured to facilitate lifting, or hoisting, and positioning of a machine tool 10 in a desired position for use of the machine tool. For example, such structures may be used to lift and position a machine tool 10 with a crane or other lifting mechanism to position the machine tool directly on or adjacent to a work piece needing to be machined.

Still referring to FIG. 1, modular linear machine-tool beds 12 according to the present disclosure—which may be referred to as beds 12, or as modular beds 12—define a straight track 30 for longitudinal translation of a tool relative to bed 12. By "straight" it is meant that the translation of ram-carriage 14 and ram 16 is generally in a straight line, subject to the natural deflection of a component within an acceptable tolerance for a desired machining operation, or subject to the result of damage or other flaw of a component. In other words, beds 12 are not configured to be bent relative to a work piece, such as to provide for a curved, or non-linear, translation of the ram-carriage and ram. Accordingly, beds 12 may be described as rigid, as not flexible, or as configured to not flex, or bend, significantly, such as to provide a rigid foundation, or base, for the machine tool 10, such that a tool may be positioned precisely by a user when machining a work piece. Illustrative, non-exclusive examples of suitable materials that beds 12 may be constructed predominantly of include (but are not limited to) ductile iron and steel.

Beds 12 are described as being modular because they include a plurality of bed sections 32 that are configured to be coupled selectively and operatively together to define the bed and the straight track 30 thereof. In FIG. 1, the dash-dot lines schematically represent that bed sections 32 may be laterally spaced relative to each other and/or may be longitudinally spaced relative to each other, with "laterally" and "longitudinally" relating to the bed itself; however, other configurations of relative relationships between bed sections 32 of a bed 12 are within the scope of the present disclosure.

Some embodiments of modular beds 12 according to the present disclosure may permit, or be configured, for selection of a desired longitudinal length of a bed, for example, depending on a specific application, a specific location, a specific work piece configuration, etc. associated with a machine tool 10. For example, a system, or kit, according to the present disclosure may include a plurality of bed sections 32 from which a user may select a subset of bed sections to assemble into a desired length of a bed 12. In some circumstances, the subset of bed sections may include all of the plurality of bed sections, and in other circumstances, the subset of bed sections may include less that all of the plurality of bed sections. Accordingly, some modular beds 12 according to the present disclosure may be assembled to have a desired longitudinal length selected from more than one possible longitudinal length, and this characteristic of modular beds 12 is schematically illustrated in FIG. 1 in dashed lines. As illustrative, non-exclusive examples, modular beds 12 may be assembled from a selection of bed sections 32 to have a longitudinal length in the range of one or more of 1-6, 1-5, 1-4, 1-3, 1-2, 2-6, 2-5, 2-4, 2-3, 3-6, 3-5, 3-4, 4-6, 4-5, and 4-6 meters. Lengths greater than and less than the enumerated ranges are also within the scope of the present disclosure.

Modular beds 12, when assembled, may include any number of bed sections 32, including two or more bed sections. In some embodiments, bed sections 32 may be configured similarly, or even identically, to each other; however, bed sections 32 are not required to be sized and/or configured identically to each other. For example, bed sections 32 may include subsets of identically or similarly configured bed sections, including two, three, four, or more such subsets, from which a user may select bed section for assembly of a modular bed 12. As an illustrative, non-exclusive example, all of or a subset of less than all of bed sections 32 may be configured to operatively engage and/or to include and/or to be coupled to a portion of a ram-carriage drive mechanism 22. Illustrative, non-exclusive examples of ram-carriage drive mechanisms 22 include (but are not limited to) ball screw mechanisms and rack and pinion mechanisms. For example, at least a subset of bed sections 32 may include or may be configured to be coupled operatively to a ball screw mount for rotationally receiving a ball screw shaft and for operatively coupling the ball screw shaft to an automatic or manual feed device, such as are commonly used with linear machine tools. Additionally or alternatively, at least a subset of bed sections 32 may include rack portions extending longitudinally relative to an assembled bed and that are configured to mate with and engage a corresponding pinion that is operatively carried by ram-carriage 14 for linear longitudinal translation of the ram-carriage and ram along the module bed, when assembled from the bed sections 32. Other configurations of bed sections and ram-carriage drive mechanisms are also within the scope of the present disclosure.

As mentioned, bed sections 32 are not required to be identical in size, such as having the same length. For example, it is within the scope of the present disclosure that the plurality of bed sections 32 may include a first subset of bed sections having a first-section length and a second subset of bed sections having a second-section length that is greater than the first-section length. In some embodiments, although not required, the second-section length may be (or approximately may be) twice the first-section length. More than two subsets of bed sections having different lengths are also within the scope of the present disclosure, as are bed sections all having the same length.

Additionally or alternatively, modular beds 12 according to the present disclosure may permit assembling a machine tool 10 in one of a cantilever configuration 34, such as is schematically represented in FIG. 1, and a gantry configuration 36, such as is schematically represented in FIG. 5 and discussed in more detail herein. By cantilever configuration, it is meant that the machine tool is assembled so that ram 16 is supported within a single region of the ram, such as adjacent only one end of the ram, for example, by ram-carriage 14. Accordingly, at least a portion of the ram will extend out, or away, (or be cantilevered) from the bed. In contrast, and as illustrated in FIG. 5, by gantry configuration, it is meant that the machine tool is assembled so that ram 16 is supported by both ends of the ram between two parallel portions of the bed, such as by two ram-carriage portions. Gantry configuration 36 may additionally or alternatively be referred to as a bridge configuration.

Additionally or alternatively, a machine tool 10 may be assembled into a double-cantilever configuration, such as illustrated in dash-dot lines in FIG. 1 with the ram 16 extending on both sides of the modular bed. This optional double-cantilever configuration may additionally or alternatively be referred to as a double overhung, or overhang, configuration. To facilitate such a configuration a ram and ram-carriage may be configured for selective positioning of the ram relative to the ram-carriage. For example, the ram may be positioned with generally equal lengths extending on either side of the modular bed or with unequal lengths extending on either side of the modular bed. Such a double cantilever configuration may be desirable in some applications, for example, depending on the configuration of a work piece, the configuration of an installation site, etc. As schematically illustrated, it is within the scope of the present disclosure that when a machine tool 10 is assembled in a double cantilever configuration, a tool 20 may be utilized on either side of, or on both sides of, the modular bed. As used herein, a double cantilever configuration is within the scope of a cantilever configuration.

As schematically indicated in FIG. 1, some modular beds 12 according to the present disclosure may include, or may be configured to include, two longitudinally parallel, laterally adjacent bed portions 38, 40. Stated differently, a selection of bed sections 32 may be coupled selectively and operatively together to define the two longitudinally parallel, laterally adjacent bed portions. FIG. 2 schematically illustrates an illustrative, non-exclusive example of an assembled modular bed 12 having three bed sections 32, collectively defining two longitudinally parallel, laterally adjacent bed portions 38, 40. As schematically illustrated, the example of FIG. 2 includes two subsets of bed sections. Specifically, the modular bed 12 of FIG. 2 includes two bed sections 42 having a first-section length and defining bed portion 40, and one bed section 44 having a second-section length that is greater than the first-section length and defining bed portion 38. Although other configurations are within the scope of the present disclosure, in the illustrated example, the second-section length is twice the first-section length. Accordingly, when the three bed sections are coupled operatively together to define the modular bed 12, the modular bed has a rectangular, or at least approximately rectangular, or regular, plan profile, as schematically illustrated in FIG. 2. As will be understood from the discussion of FIG. 3 herein, the bed sections of the example of FIG. 2 may be from a system, or kit, that includes more than three bed sections, such as to permit for selective assembly of a modular bed in more than one desired longitudinal length.

As illustrative, non-exclusive examples, bed sections 42 may have a first-section length in the range of 0.2-1, 0.2-0.8, 0.2-0.6, 0.2-0.4, 0.4-1, 0.4-0.8, 0.4-0.6, 0.6-1, 0.6-0.8, or 0.8-1 meters, and bed sections 44 may have a second-section length in the range of 0.4-2, 0.4-1.6, 0.4-1.2, 0.4-0.8, 0.8-2, 0.8-1.6, 0.8-1.2, 1.2-2, 1.2-1.6, or 1.6-2 meters, respectively. Bed sections 32 may have widths in the range of 0.1-0.5, 0.1-0.4, 0.1-0.3, 0.1-0.2, 0.2-0.5, 0.2-0.4, 0.2-0.3, 0.3-0.5, 0.3-0.5, or 0.4-0.5 meters. Other lengths and widths greater than and less than the enumerated ranges are also within the scope of the present disclosure.

With continued reference to FIG. 2, the two illustrated bed sections 42 may be described as being coupled operatively and longitudinally to each other with a joint 46 defined between the two longitudinally adjacent bed sections. Joint 46 may additionally or alternatively be described as a juncture 46 and/or an abutment 46. Additionally, the two bed sections 42 may be described as being coupled operatively and laterally to bed section 44, with a joint 48 defined between the laterally adjacent bed sections.

FIG. 2 also schematically illustrates various optional coupling structures 50 that may be used to couple operatively and physically bed sections 32 together to form a modular bed 12. Illustrative, non-exclusive examples of structures 50 include (but are not limited to) bolts, nuts, tapped-bores, ball locks, etc. While an optional coupling structure is illustrated schematically coupling longitudinally adjacent bed sections 42, it is within the scope of the present disclosure that coupling structures 50 may be present only for coupling laterally adjacent bed sections. Moreover, the number and spacing of the schematically illustrated coupling structures 50 is not limiting and any number of coupling structures may be utilized with a modular bed 12, a machine tool 10, or a kit thereof.

Turning now to FIG. 3, another illustrative, non-exclusive modular bed 12 is schematically illustrated, with the modular bed of FIG. 3 including two bed sections 42 and two bed sections 44, with one of each bed section collectively defining the two longitudinally parallel, laterally adjacent bed portions 38, 40. Moreover, as schematically illustrated in dash-dot lines in FIG. 3, modular beds 12 may be assembled with more bed sections to define modular beds having longer lengths. Considering the examples of FIGS. 2 and 3, it is understood that kits having two shorter bed sections 42 and any number of longer bed sections 44 may permit for assembly of modular beds having any desired length that is a multiple of the first-section length of shorter bed sections 42. For example, two bed sections 42 may be coupled laterally and operatively together to form a modular bed 12 having a first-section length. Two longer bed sections 44 may be coupled operatively together to form a modular bed 12 having a length that is twice the first-section length. Alternatively, one longer bed section 44 and two shorter bed sections 42 may be coupled operatively together to form a modular bed 12 having a length that is twice the first-section length, such as schematically represented in FIG. 2. Two longer bed sections 44 and two short bed sections 42 may be coupled operatively together to form a modular bed 12 having a length that is three times the first-section length, as schematically represented in solid lines in FIG. 3. And so on.

As illustrated in FIG. 3, when at least two of each of the longer bed sections 44 and the shorter bed sections 42 are used to assemble a modular bed 12, the joints 46 between longitudinally adjacent bed sections of bed portion 38 do not align with joints 46 between longitudinally adjacent bed sections of bed portion 40. Stated differently, when at least two of each of the longer bed sections and the short bed sections are used to assemble a modular bed, the laterally adjacent bed sections may be described as being longitudinally staggered. Additionally or alternatively, the joints 46 may be described as being longitudinally staggered. Accordingly, when a ram-carriage 14 is coupled operatively to such an assembled modular bed 12, as schematically illustrated in FIG. 3, the ram-carriage, if appropriately sized, will not span, or travel over, more than one joint 46 at any given time. This configuration results in a very stable interface between the bed and the ram-carriage, such as to permit for precise translation of a ram along the bed and thus for precise placement of an associated tool that is carried operatively by the ram.

During assembly of a modular bed 12 according to the present disclosure, it may be desirable to precisely align the two longitudinally parallel, laterally adjacent bed portions 38, 40, as well as the longitudinally adjacent bed sections 32 of each of the bed portions 38, 40. For example, as discussed herein, modular beds 12, when assembled, define a straight track 30. This straight track, and in particular the straightness and uniformity of the straight track, may be critical to the precision of a machine tool 10 according to the present disclosure, such as for the precise translation of a ram along the bed and thus the precise placement of an associated tool that is carried operatively by the ram. To facilitate this precise assembly of a modular bed 12, a kit according to the present disclosure may include an alignment tool 60 that is configured to be coupled operatively, selectively, and in some embodiments temporarily, to adjacent bed sections during the assembly process to precisely define straight track 30. For example, as schematically illustrated in dash-dot lines in FIG. 3, an alignment tool 60 may be configured to overlap joint 48 between the bed portions 38, 40, and optionally one or more of the joints 46 between longitudinally adjacent bed sections. To facilitate the precise coupling of the bed sections with the alignment tool, suitable coupling structures 62 may be provided and utilized. For example, bed sections 32 may define tapped-bores that mate with corresponding bolts extending through bores in the alignment tool. Other coupling structures 62 are also within the scope of the present disclosure.

During assembly, the optional alignment tool 60 may be utilized to precisely align adjacent bed sections prior to utilizing the coupling structures 50 to couple operatively and physically adjacent bed sections together. In some embodiments, the alignment tool may be removed after coupling adjacent bed sections, such as to utilize the alignment tool with other adjacent bed sections being aligned and/or to facilitate the further assembly of a machine tool, such as to permit the installation of a ram-carriage drive mechanism. Additionally or alternatively, in some embodiments it may be necessary to remove the alignment tool to permit appropriate functionality of other components of a machine tool, such as the linear translation of a ram-carriage along the modular bed. However, it is also within the scope of the present disclosure that some embodiments may be configured so that one or more alignment tools may remain coupled to the modular bed during use of the modular bed and associated machine tool, for example, to maintain the precise coupling of adjacent bed sections. In some embodiments and/or in some configurations of modular beds 12, the one or more alignment tools optionally, preferably, or (in some embodiments even) critically may remain coupled to the modular bed.

As a further illustrative, non-exclusive and additional or alternative example, the alignment tool 60 may have one or more planar, or flat, surfaces that are configured to directly engage one or more planar, or flat, surfaces 64 of the bed sections 32. In some such embodiments, the various planar surfaces 64 may be coextensive, or planar (or at least as closely as possible within acceptable tolerances), when the modular bed is assembled. In such an embodiment, the alignment tool may include an elongate planar surface that engages each of the planar surfaces 64 of the bed sections being aligned and assembled at a given time. In other embodiments, the alignment tool and the bed sections may include more than one planar surface and/or regular and/or irregular surfaces that respectively mate with each other during assembly utilizing the alignment tool. Other configurations are also within the scope of the present disclosure. In some embodiments, although not required, the alignment tool may have a length that is equal to the second-section length of the longer bed sections 44. It is also within the scope of the present disclosure that an embodiment of a modular bed 12 may not require any separate alignment tool or tools 60 for precisely assembling the modular bed. For example, it is within the scope of the present disclosure that the coupling structures 50 may facilitate precise alignment of the bed sections during assembly.

As mentioned, the assembling of bed sections 32 to define a modular bed 12 facilitates the defining of straight track 30. In some embodiments, such as schematically illustrated in FIG. 4 (although not required), straight track 30 may be defined by a pair of spaced-apart tracks 66. Accordingly, in embodiments in which the modular bed is defined by two longitudinally parallel, laterally adjacent bed portions 38, 40, each of the bed portions may define one of the tracks 66. Moreover, each bed section 32 may include a section of linear track that is aligned linearly with the section of linear track of a longitudinally adjacent bed section to define the respective tracks 66 when a modular bed is assembled. As schematically illustrated in FIG. 4, a ram-carriage 14 therefore may include corresponding track sections 68 that are configured to mate with tracks 66 of the modular bed. In the schematically illustrated example, the ram-carriage includes four track sections 68, with a pair of track sections 68 mated with a respective track 66 of the modular bed; however, it is within the scope of the present disclosure that a ram-carriage may include only two track sections 68 for mating with the tracks 66 of the modular bed. It is also within the scope of the present disclosure that an embodiment or configuration of a modular bed 12 includes only a single track 66 and thus that an embodiment of a ram-carriage 14 includes one or more track sections 68 configured to engage only the single track of a modular bed.

Tracks 66 of a modular bed 12 and track sections 68 of a ram-carriage 14 may take any suitable form such that smooth and precise translation of the ram-carriage relative to the modular bed is facilitated. As an illustrative, non-exclusive example, a track 66 may be defined by a rail, and a track section 68 may be defined by a receiver, or rail block. That is, the rail and receiver may generally define a male/female, or tenon/mortise, relationship when coupled operatively together, with the tolerance between the two structures facilitating a smooth and precise translation of the ram-carriage relative to the modular bed. Additionally or alternatively, the modular bed may define a female structure, and the ram-carriage may define a male structure. Other configurations of tracks and track sections are also within the scope of the present disclosure. In some embodiments, the male and female relationship between the tracks may restrict separation of the ram-carriage from the modular bed. For example, a rail and receiver may have generally T-shaped, I-shaped, or dove-tail cross-sectional profiles, but other configurations are within the scope of the present disclosure. A suitable material from which rails and receivers may be constructed includes (but is not limited to) alloy steel.

In some embodiments, although not required, the rails and/or receivers that define track portions 66 of bed sections 32 may be sized, shaped, or otherwise configured, so that when longitudinally adjacent bed sections are coupled operatively together, a small gap is defined between longitudinally adjacent track sections. When present these gaps may allow for heat expansion of the track sections without undesirably affecting the precision of an assembled machine tool 10. Additionally or alternatively, these gaps may permit for longitudinally adjacent bed sections to be coupled operatively together without interference between longitudinally adjacent track sections. That said, when present, these gaps may be small enough so as to not affect the precise longitudinal translation of the ram-carriage along track 30.

As mentioned, it is within the scope of the present disclosure that some embodiments of ram-carriage 14 may include two pairs of spaced-apart track sections 68 that mate with respective tracks 66 of a modular bed 12, such as schematically illustrated in FIG. 4. In such embodiments, when an appropriately sized ram-carriage translates along track 30 and spans a joint 46 between two longitudinally adjacent bed sections 32, three of the four track sections 68 will not span the joint, as illustrated in FIG. 4 with a single track section 68 spanning the illustrated joint 46. Such a configuration, although not required in all embodiments, results in a very stable interface between the modular bed and the ram-carriage, such as to permit for very precise translation of a ram relative to the modular bed and thus for very precise placement of an associated tool that is carried operatively by the ram.

In embodiments of ram-carriage 14 that include track sections 68 in the form of spaced-apart female, or mortise, configured receivers, or rail blocks, such as in the schematically illustrated example of FIG. 4, an optional rail clamp 70 may be included between the spaced-apart rail blocks. Rail clamps 70, when present, may permit for selective clamping, or locking, of the ram-carriage relative to the modular bed, so as to restrict (and preferably prevent) undesired translation of the ram-carriage relative to the modular bed. For example, depending on a specific application, it may be desirable to lock the ram-carriage, and thus the ram, in place to facilitate manipulation of a tool only in directions transverse to the longitudinal axis of the modular bed.

FIG. 5 schematically illustrates a machine tool 10 and a modular bed 12 in a gantry configuration 36. As illustrated, the modular bed includes two longitudinal bed portions 38, 40 that are spaced apart from each other. When a modular bed is assembled into a gantry configuration, the longitudinal bed portions 38, 40 additionally or alternatively may be described as two spaced-apart beds 38, 40. In the illustrated example, each of the spaced-apart beds includes a short bed section 42 and a long bed section 44. Accordingly, with reference to both of FIGS. 3 and 5, it is understood that the same bed sections may be used to construct a modular bed in either of a cantilever configuration or a gantry configuration. While the example of FIG. 5 includes four bed sections, it is within the scope of the present disclosure that a bed 12 may be constructed from two or more bed sections 32 to define a machine tool 10 in a gantry configuration.

As schematically and optionally illustrated in FIG. 5, it is within the scope of the present disclosure that longitudinally adjacent bed sections may be coupled operatively together utilizing coupling structures 50. Additionally or alternatively, at least one gantry alignment tool 72 may be provided and utilized to couple operatively together longitudinally adjacent bed sections of each bed portion, when more than one bed section is utilized to assemble a bed portion of a modular bed 12 in a gantry configuration. Specifically, gantry alignment tools 72, when utilized, may be configured to precisely align longitudinally adjacent bed sections so that the straight track 30, and more specifically so that each track 66, is precisely defined for smooth translation of ram-carriage 14 along the modular bed. In some embodiments, modular beds 12 may be configured so that a gantry alignment tool need only be coupled temporarily to longitudinally adjacent bed sections, such as to precisely align the bed sections while they are coupled directly together, such as utilizing coupling structures 50. However, it is also within the scope of the present disclosure that gantry alignment tools 72 may be coupled operatively to longitudinally adjacent bed sections and maintained as part of the assembly of the modular bed when it is in a gantry configuration.

To facilitate the precise coupling of the longitudinally adjacent bed sections with the gantry alignment tool 72, suitable coupling structures 74 may be provided and utilized. For example, bed sections 32 may define tapped-bores that mate with corresponding bolts extending through bores in the gantry alignment tool. Other coupling structures 74 are also within the scope of the present disclosure, and it is within the scope of the present disclosure that coupling structures 74 may include or incorporate coupling structures 50 or portions or aspects thereof.

Similar to alignment tool 60, discussed herein, a gantry alignment tool 72 may have one or more planar, or flat, surfaces 76 that are configured to directly engage one or more planar, or flat, surfaces 78 of the bed sections 32, such as lateral side surfaces of the bed sections. In some such embodiments the various planar surfaces 78 may be coextensive, or planar (or at least as closely as possible within acceptable tolerances), when the longitudinally adjacent bed sections are coupled operatively together to define the two spaced-apart beds of a modular bed in the gantry configuration. In such an embodiment, the gantry alignment tool may include an elongate planar surface 76 that engages each of the planar surfaces 78 of the bed sections being aligned and assembled. In other embodiments, the gantry alignment tool and the bed sections may include more than one planar surface and/or regular and/or irregular surfaces that respectively mate with each other during assembly utilizing the alignment tool. Other configurations are also within the scope of the present disclosure. In some embodiments, although not required, a gantry alignment tool may have a length that is equal to the second-section length of the longer bed sections 44. It is also within the scope of the present disclosure that gantry alignment tools may be provided in more than one length, such as depending on a particular configuration of modular bed 12 being constructed.

When a machine tool 10 optionally is configured to be converted between a cantilever configuration and a gantry configuration, it is within the scope of the present disclosure that a modular ram-carriage may be utilized. For example, with reference to both of FIGS. 4 and 5, a ram-carriage 14 may include two carriage portions 80, 82 that are configured to be coupled operatively and selectively together for use with a machine tool in a cantilever configuration, such as schematically illustrated in the example of FIG. 4, and to be separated and spaced-apart selectively for use with a machine tool in a gantry configuration, such as schematically illustrated in the example of FIG. 5. Stated differently, a ram-carriage 14 may be configured to be separated selectively into two carriage portions with each portion being configured to mate with the linear tracks 66 of the respective bed sections of the two-spaced apart bed portions 38, 40 when in a gantry configuration, and may be configured to be coupled selectively together into a single carriage portion configured to mate with the linear tracks 66 of the respective bed sections of the longitudinally parallel, laterally adjacent bed portions 38, 40 when in a cantilever configuration. It is also within the scope of the present disclosure that the two carriage portions 80, 82 of a modular ram-carriage 14 may not be physically and directly connected together when the two portions are being used with a modular bed assembled in a cantilever configuration. In examples in which two portions of a modular ram-carriage are directly connected together when assembled for a cantilever configuration of a machine tool, as an illustrative, non-exclusive example, the two portions may be coupled together via one or more pins, or dowels, received within respective bores extending into the respective inside faces of the two portions. Such pins also may be described as locating pins, because, when present, that may help facilitate a user connecting the two ram portions for use in a cantilever configuration. It is also within the scope of the present disclosure that a machine tool system, or kit, includes two ram-carriages, with one ram-carriage being configured for use with a machine tool 10 in a cantilever configuration and another ram-carriage (two ram-carriages) being configured for use with a machine tool 10 in a gantry configuration. Other configurations also are within the scope of the present disclosure.

Systems according to the present disclosure that include component parts for selectively assembling a machine tool 10 in either a cantilever configuration or a gantry configuration may (but are not required to) include more than one ram, with at least two rams having different lengths. Additionally or alternatively, a ram according to the present disclosure may be configured to have a variable length. Both of these optional options are schematically illustrated in FIG. 1, with the ram 16 illustrated in dashed lines with a greater length than the ram 16 illustrated in solid lines. That is, FIG. 1 schematically illustrates both of a ram having a variable (i.e., adjustable) length, as well as systems, or kits having two rams of different lengths. Having a machine tool 10 that is optionally convertible from a cantilever configuration to a gantry configuration provides versatility for the user of the machine tool, for example, depending on the specific application for which it is used, depending on the size, shape, location, and/or configuration of a work piece to be machined, etc. In some circumstances, a shorter ram may be sufficient to adequately perform the desired working of a work piece, while in other circumstances, a longer ram may be required to reach the entirety of the work space, or machining envelope. Depending on the configuration and properties of the modular bed and ram, a longer ram, when used in a cantilever configuration, may result in undesired conditions, such as resulting from the ram deflecting, or bending, relative to the modular bed. For example, as a result of a longer ram used in a cantilever configuration, a tool being used may chatter, bite, or skip on a work piece. Additionally or alternatively, the precision of the machine tool may be affected, because a tool may not be able to be precisely positioned as a result of the ram deflecting relative to the modular bed. Accordingly, in such circumstances, it may be desirable for a user to assembly the machine tool into a gantry configuration and use the longer ram, which as discussed herein, will be supported from both of its ends, thereby resulting in a stable configuration of the machine tool for precision machining or other working of a work piece. A suitable material from which a ram substantially may be constructed is (but is not limited to) steel, such as low carbon steel.

As illustrative, non-exclusive examples, rams configured for use with a machine tool 10 in a cantilevered configuration may have lengths in the range of 0.3-1.5, 0.3-1.1, 0.3-0.7, 0.7-1.5, 0.7-1.1, or 1.1-1.5 meters, and rams configured for use with a machine tool 10 in a gantry configuration may have lengths in the range of 1-3, 1-2.5, 1-2, 1-1.5, 1.5-3, 1.5-2.5, 1.5-2, 2-3, 2-2.5, or 2.5-3 meters. Other lengths greater than and less than the enumerated ranges are also within the scope of the present disclosure.

Turning now to FIGS. 6-9, an illustrative, non-exclusive example of a modular machine tool 10 according to the present disclosure is illustrated and indicated generally at 100. Where appropriate, the reference numerals from the schematic illustrations of FIGS. 1-5 are used to designate corresponding parts of machine tool 100; however, the example of FIGS. 6-9 is non-exclusive and does not limit the present disclosure to the illustrated embodiment. That is, neither machine tools 10, nor portions thereof, are limited to the specific embodiment of machine tool 100 illustrated in FIGS. 6-9, and machine tools 10 may incorporate any number of the various aspects, configurations, characteristics, properties, etc. of machine tools 10 or components thereof, of the schematically illustrated examples of FIGS. 1-5, as well as variations thereof, without requiring the inclusion of all such aspects, configurations, characteristics, properties, etc. For the purpose of brevity, each previously discussed component, part, portion, aspect, region, section, etc. or variants thereof may not be discussed again with respect to machine tool 100 of FIGS. 6-9; however, it is within the scope of the present disclosure that the previously discussed features, variants, etc. may be utilized with machine tool 100.

Figure 6:
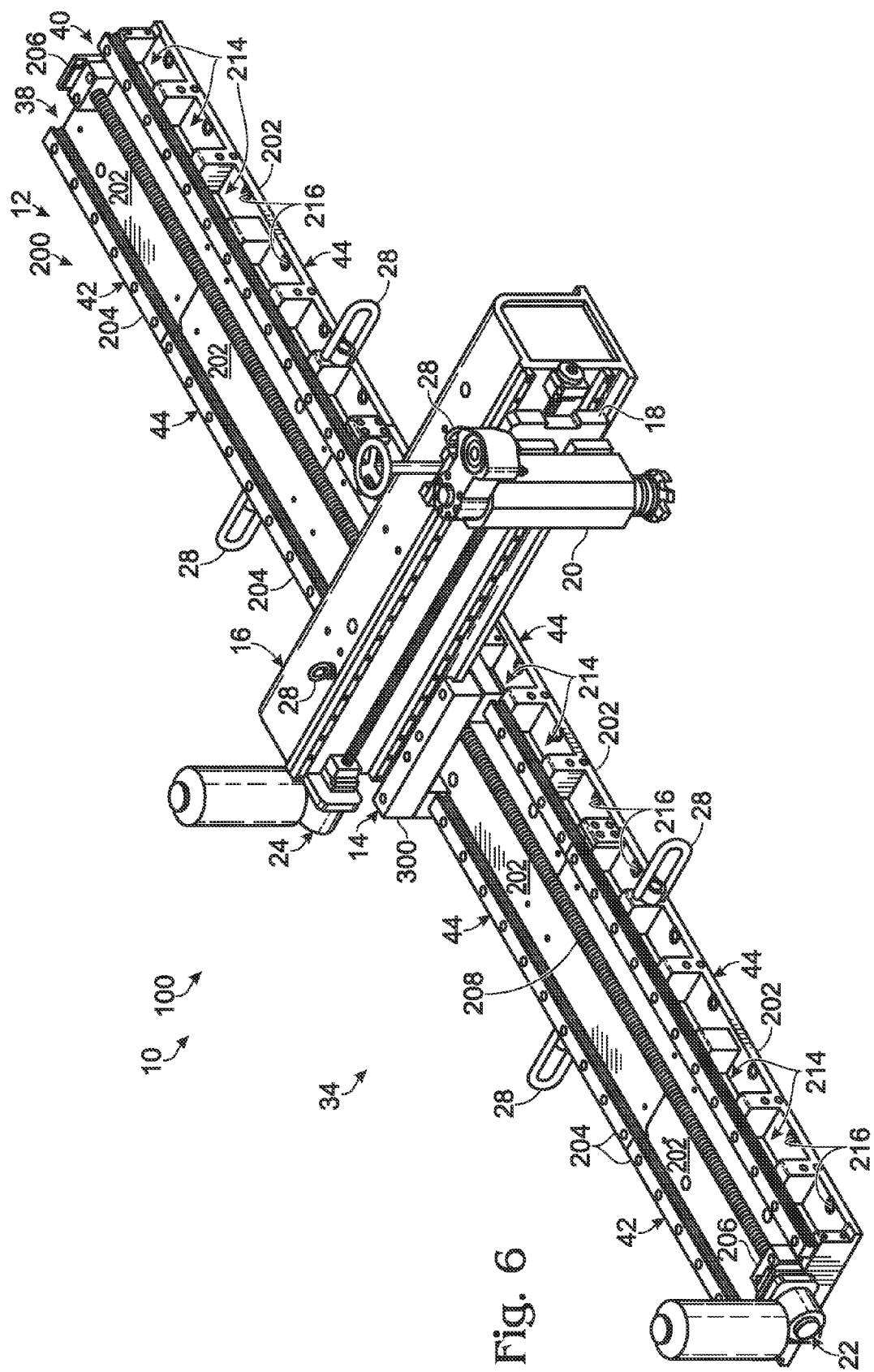
FIG. 6 is an isometric top view of an illustrative, non-exclusive example of a modular machine tool according to the present disclosure in a cantilever configuration.

As perhaps best seen in FIG. 6, in which machine tool 100 is illustrated in its cantilever configuration 34, machine tool 100 includes a modular linear machine-tool bed 12, a modular ram-carriage 14, a ram 16, a tool-carriage 18, a tool 20 in the form of a milling head, a ram-carriage drive mechanism 22 in the form of a ball screw mechanism, and a tool-carriage drive mechanism 24 also in the form of a ball screw mechanism.

The illustrative, non-exclusive example of modular linear machine-tool bed 12 of machine tool 100 is indicated as modular bed 200 and is assembled from five longer bed sections 44 and two shorter bed sections 42. However, as discussed herein, a kit from which modular bed 200 is assembled may include more than five longer bed sections 44, as well as more than two shorter bed sections 42. In FIG. 6, machine tool 100 and modular bed 200 are assembled in a cantilever configuration. Accordingly, modular bed 200 is defined by two longitudinally parallel, laterally adjacent bed portions 38, 40 that are coupled operatively together.

The bed sections 32 of modular bed 200, each include a section body 202 and a section 204 of track 66 attached to the section body. Two of the longer bed sections 44 each also include a ball screw mount 206 attached to the section body, with these mounts operatively positioning a ball screw 208 for selective translation of the ram-carriage. More specifically, with direct reference to FIG. 6, the longer bed section 44 in the near left corner of modular bed 200 and the longer bed section 44 in the near right corner of modular bed 200 each includes a ball screw mount 206. However, it is within the scope of the present disclosure that each of the various bed sections 32 of a kit may be configured for attaching a ball screw mount 206 thereto. Accordingly, depending on the desired length of modular bed 200 being assembled, any respective bed section that is positioned at the terminal ends of the assembled bed may be used to secure the ball screw mount in place. For example, as an illustrative, non-exclusive example, if a modular bed 200 were assembled from only a single longer bed section 44 and two shorter bed sections 42, such as schematically illustrated in FIG. 2, the ball screw mounts may be attached either to the distal ends of the two shorter bed sections or to the distal ends of the single longer bed section.

Although not seen in the perspective of FIG. 6, section bodies 202 also define a series of tapped-bores 212 that are spaced longitudinally along the inner lateral edges of the bodies as illustrated in and discussed below with reference to FIG. 8. As discussed, these bores define a portion of coupling structure 62 for facilitating the use of an associated alignment tool during assembly of the modular bed.

Section bodies 202 further define three or six cavities 214 (depending on the length of the respective bed section) that extend in from the outer lateral sides of the bed sections. As illustrated, these cavities provide access to a series of bores 216 defined in the bodies and that may be used to bolt, or otherwise secure, the modular bed to a work piece or other structure at a desired installation site. Although not seen from the perspective of FIG. 6, these cavities also provide access to a series of bores 218 that extend through the inner lateral side walls of the bed sections and which define a portion of coupling structure 50 for operatively coupling together the laterally adjacent bed sections. These structures are illustrated in and discussed below with respect to FIG. 8.

Figure 7:
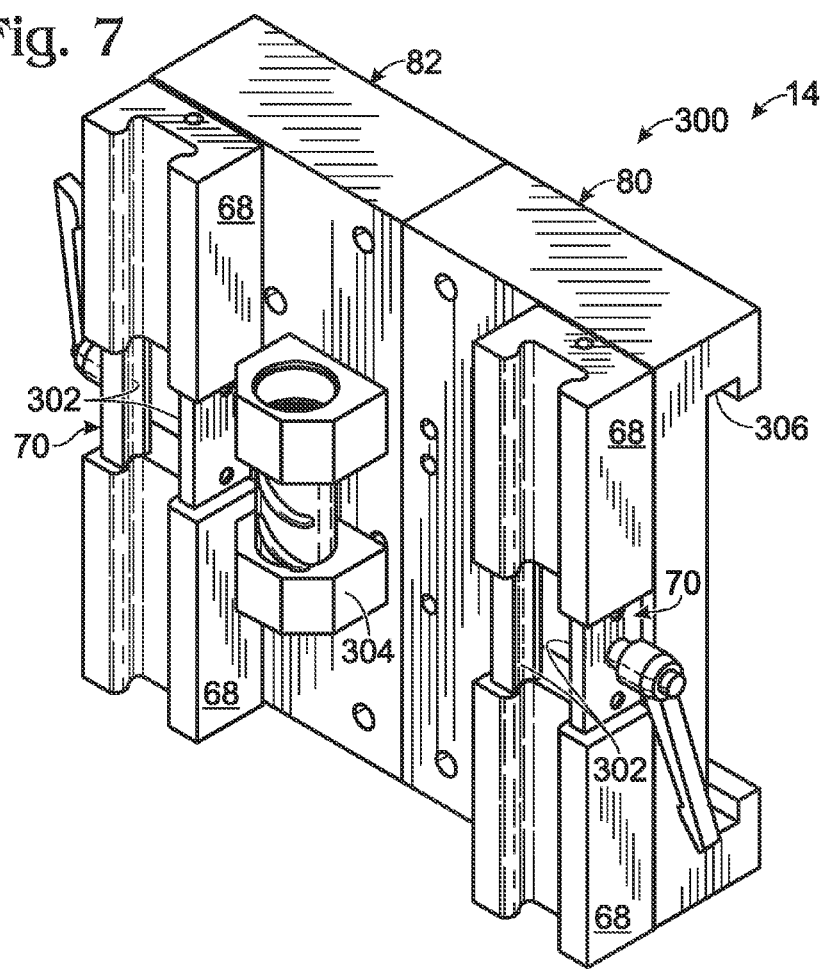
FIG. 7 is an isometric bottom view of the ram-carriage of the modular machine tool of FIG. 6.

As best seen in FIG. 7, the illustrative, non-exclusive example of the ram-carriage 14 of machine tool 100 is indicated as modular ram-carriage 300 and includes two carriage portions 80, 82 operatively coupled together for use with machine tool 100 in its cantilever configuration 34. As discussed below with respect to FIG. 9, however, the two carriage portions may be separated selectively for use with machine tool 100 in its gantry configuration 36. Modular ram-carriage 300 also includes two pairs of spaced-apart track sections 68 that are configured to mate with tracks 66 of the modular bed, with each pair of track sections 68 on one of the two carriage portions 80, 82. Modular ram-carriage 300 further includes rail clamps 70 interposed between each pair of track sections 68. The rail clamps of modular ram-carriage 300 are manually operable by a user to selectively secure, or lock, the modular ram-carriage to a desired location along the modular bed 200. Although other configurations are within the scope of the present disclosure, as an illustrative, non-exclusive example, the optional rail clamps of a ram-carriage may be constructed of a polymeric material in sections that are molded directly from a corresponding piece of track section 68, so as to define clamping surfaces 302 that do not damage track 66 of the modular bed.

Modular ram-carriage 300 also includes a nut 304 mounted to the underside of carriage portion 82, with this nut mating with the ball screw 208 of the ram-carriage drive mechanism for selective translation of the ram-carriage along the modular bed. Nut 304 may additionally or alternatively be referred to as a ball nut 304 or as a ball screw nut 304. Modular-ram 300 also defines a channel 306 for mating with and securing the ram of machine tool 100.

Figure 8:
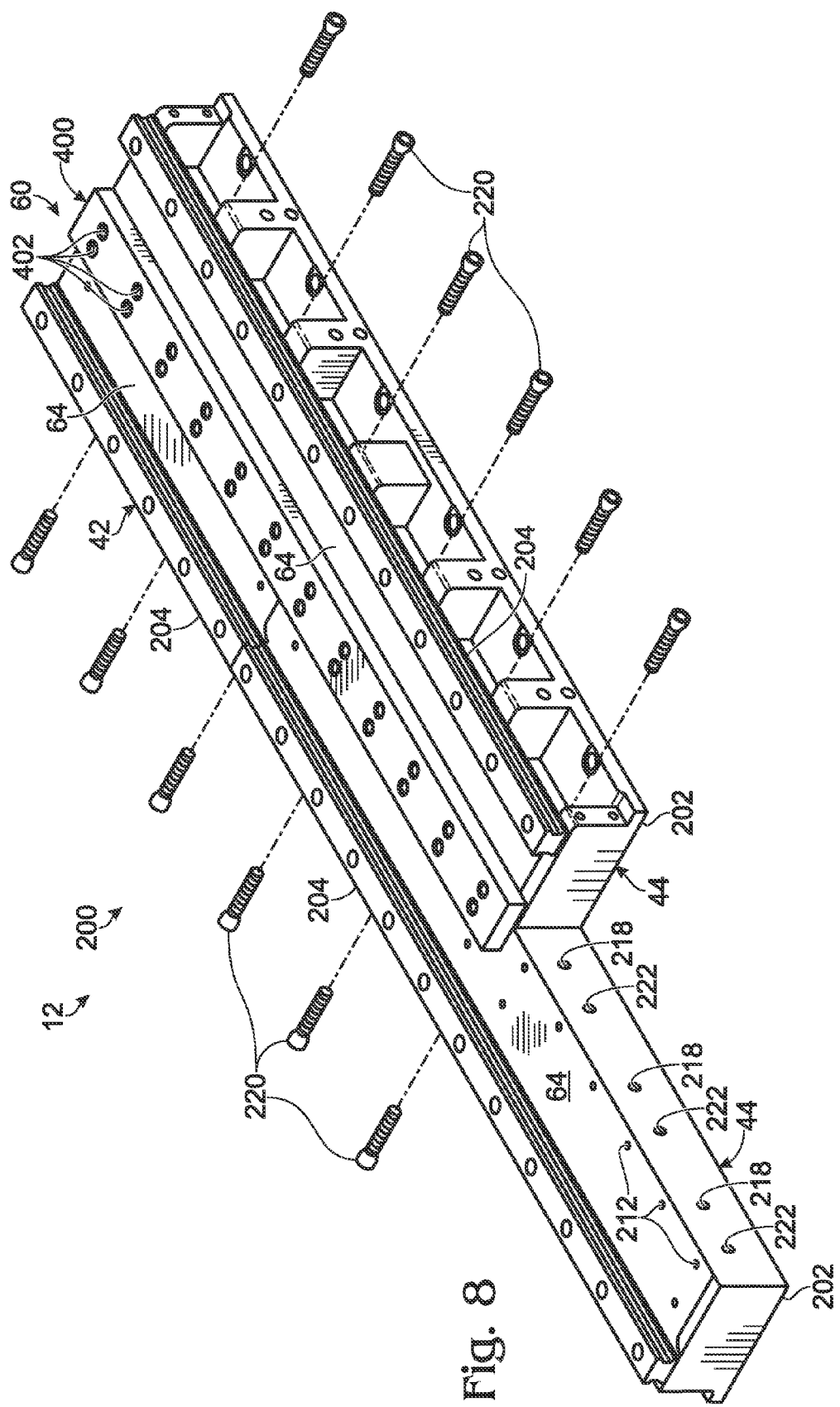
FIG. 8 is a partially exploded isometric top view of a portion of the modular linear machine-tool bed of the modular machine tool of FIG. 6, together with an associated alignment tool used during assembly of the modular linear machine-tool bed.

FIG. 8 illustrates modular bed 200 in the process of being assembled using an alignment tool 60, which is indicated in FIG. 8 as alignment tool 400. Alignment tool 400 may be described as being elongate and having a generally rectangular prismatic shape. Alignment tool 400 includes a series of bores 402 that are positioned and configured to correspond to tapped-bores 212 of the section bodies 202 of modular bed 200. These bores 402 may be described as defining a portion of coupling structure 62. Accordingly, when laterally adjacent and longitudinally adjacent bed sections are being assembled to form the modular bed, alignment tool 400 may be bolted to the bed sections to bring their upper surfaces 64 into alignment within a single plane, and thus the sections 204 of track 66 into precise linear alignment with each other. Once the alignment tool has been appropriately secured to the bed sections, the laterally adjacent bed sections may be directly coupled to each other, utilizing bolts 220, through bores 218 and into a series of tapped-bores 222 defined in the inner lateral side walls of the section bodies 202. Bolts 220, bores 218, and tapped-bores 222 collectively may be described as defining coupling structure 50 according to the present disclosure. Once the laterally adjacent bed sections are appropriately secured together utilizing coupling structure 50, the alignment tool may be removed and either used for a longitudinally adjacent section of the modular bed being assembled, or may be set aside and stored for future use.

Figure 9:
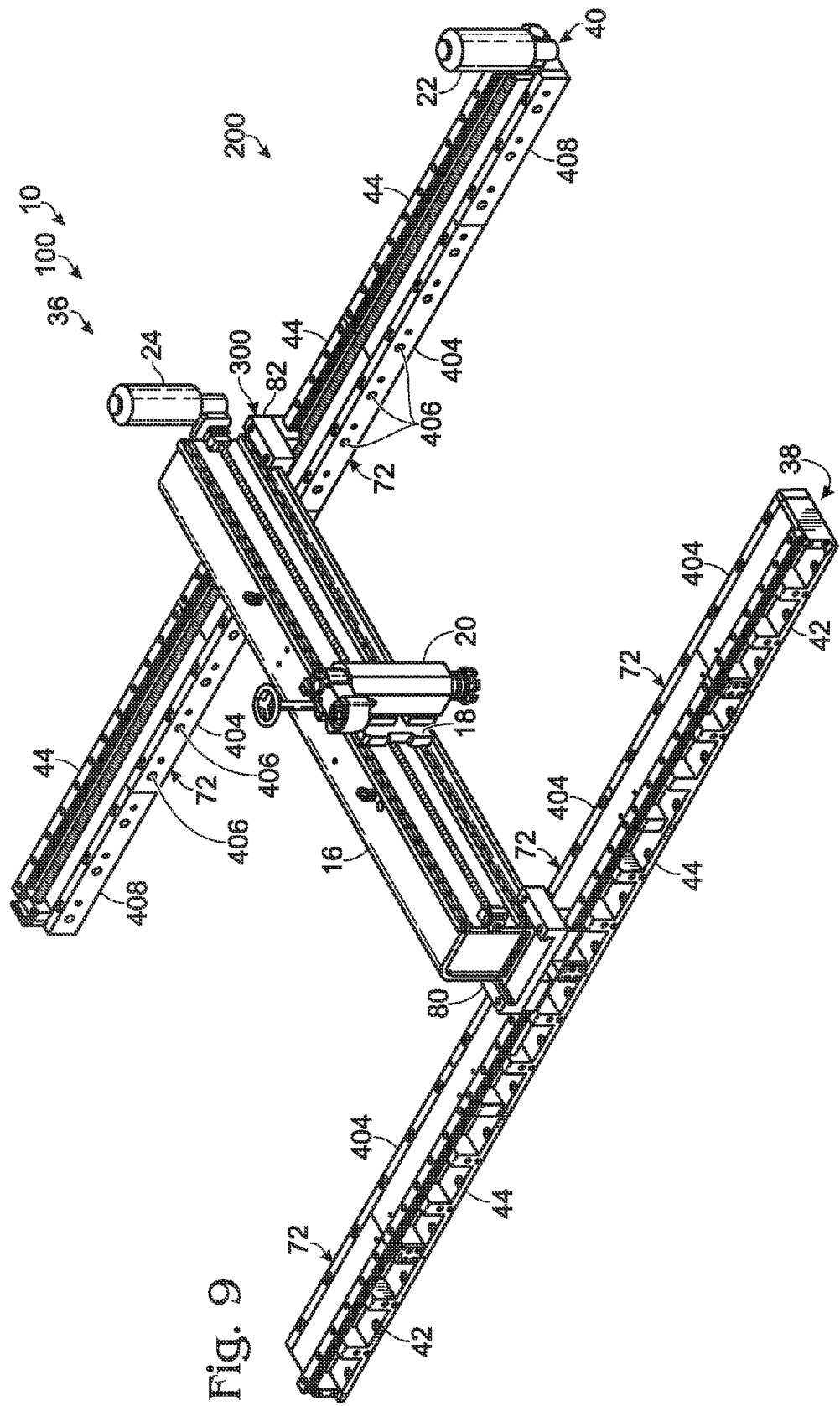
FIG. 9 is an isometric top view of the modular machine tool of FIG. 6 in a gantry configuration.

Turning finally to FIG. 9, modular machine tool 100 is illustrated in a gantry configuration 36, with bed portions 38 and 40 being spaced-apart from each other, with respective ram-carriage portions 82 and 80 also being spaced-apart from each other, and with an optional longer ram 16 extending between the two ram-carriage portions and beds. Additionally, five gantry alignment tools 72 are utilized, with these illustrative examples indicated at 404 in FIG. 9 and having a length equal to the length of the longer bed section 44. Specifically, each gantry alignment tool is utilized to couple and align longitudinally adjacent bed sections of each bed portion. Gantry alignment tools 404 may be described as being elongate and having a generally rectangular prismatic shape. Each gantry alignment tool 404 includes a series of bores 406 that are positioned and configured to correspond to tapped-bores 222 of the section bodies 202 of modular bed 200. These bores 406 may be described as defining a portion of a coupling structure 74. Accordingly, when longitudinally adjacent bed sections are being assembled to form the modular bed in a gantry configuration, gantry alignment tools 404 may be bolted to the bed sections to bring their inner lateral side surfaces 78 into alignment in a single plane, and thus the sections 204 of track 66 into precise linear alignment with each other. In the illustrative example of modular bed 200, the gantry alignment tools 404 remain coupled to respective longitudinally adjacent bed sections to maintain the bed portions in an assembled configuration.

In addition to the five gantry alignment tools 404 illustrated in FIG. 9, modular machine tool 100 also is illustrated as having two plates 408 attached to the inside lateral surfaces of the distal ends of the two distal longer bed sections 44 of bed portion 40, with these plates being similar to the gantry alignment tools but not physically coupling longitudinally adjacent bed sections. It is within the scope of the present disclosure, however, that these plates 408 simply may not be utilized or included within a kit according to the present disclosure. It is also within the scope of the present disclosure, that a kit may include gantry alignment tools that have a length equal to one and a half times the length of a longer bed section 44, so that when a bed portion 38 or bed portion 40 is assembled such that one or both of the distal bed sections is a longer bed section 44, the longer gantry alignment tool may be utilized so that it extends to the distal end of the respective bed portion. For example, in the illustrative, non-exclusive example of bed portion 40 in FIG. 9, two longer gantry alignment tools may be utilized to couple together the three longitudinally adjacent longer bed sections 44, with the longer gantry alignment tools being extensive with the full length of the three longer bed sections 44.

In FIG. 9, modular bed 200 in the gantry configuration is illustrated as having the same number of bed sections and thus the same length as modular bed 200 in the cantilever configuration of FIG. 6; however, as discussed herein, any number of bed sections may be utilized to assemble a modular bed into any desired length, whether for assembly in a cantilever configuration or a gantry configuration.

Illustrative, non-exclusive examples of systems, modular machine tools, and modular linear beds according to the present disclosure are described in the following enumerated paragraphs.

A A modular machine-tool system (or kit), comprising:

a plurality of bed sections configured to be coupled operatively and selectively together to define a linear machine-tool bed, wherein the bed sections are configured to define a straight track for longitudinal translation of an associated tool relative to the linear machine-tool bed.

A1 The system of paragraph A, wherein the bed sections are rigid.

A2 The system of any of paragraphs A-A1, wherein the bed sections are configured to not flex (or bend) significantly.

A3 The system of any of paragraphs A-A2, wherein the bed sections are constructed substantially of at least one of steel and ductile iron.

A4 The system of any of paragraphs A-A3, wherein the bed sections are configured to be coupled operatively and selectively together to define selectively a desired longitudinal length of the linear machine-tool bed from a selection of more than one possible longitudinal length.

A5 The system of any of paragraphs A-A4, wherein the bed sections are configured to be coupled operatively and selectively together to define two longitudinally parallel, laterally adjacent bed portions.

A5.1 The system of paragraph A5, wherein the bed sections are configured to be coupled operatively and selectively together so that joints between longitudinally adjacent bed sections of one bed portion do not align with joints between longitudinally adjacent bed sections of the other bed portion.

A5.2 The system of any of paragraphs A5-A5.1, wherein the bed sections are configured to be coupled operatively together so that laterally adjacent bed sections are longitudinally staggered.

A5.3 The system of any of paragraphs A5-A5.2, further comprising:

an alignment tool configured to be coupled operatively, selectively, and temporarily to the longitudinally parallel, laterally adjacent bed portions to align the longitudinally parallel, laterally adjacent bed portions and the longitudinally adjacent bed sections during assembly of the linear machine-tool bed so that the straight track is defined.

A5.3.1 The system of paragraph A5.3, wherein the alignment tool includes an elongate flat surface configured to engage flat surfaces of the longitudinally parallel, laterally adjacent bed portions and the longitudinally adjacent bed sections during assembly of the linear machine-tool bed.

A5.3.2 The system of any of paragraphs A5.3-A5.3.1, wherein the alignment tool has a generally rectangular prismatic shape.

A5.3.3 The system of any of paragraphs A5.3-A5.3.2, wherein the alignment tool is configured to be bolted selectively and temporarily to the longitudinally parallel, laterally adjacent bed portions to align the longitudinally parallel, laterally adjacent bed portions and the longitudinally adjacent bed sections during assembly of the linear machine-tool bed so that the straight track is defined.

A6 The system of any of paragraphs A-A5.3.3, wherein the plurality of bed sections includes a first subset of bed sections having a first-section length and a second subset of bed sections having a second-section length that is greater than the first-section length.

A6.1 The system of paragraph A6, wherein the second-section length is (or is approximately) twice the first-section length.

A6.2 The system of any of paragraphs A-A6.1, wherein the first subset of bed sections includes at least two bed sections and the second subset of bed sections includes at least one bed section.

A6.3 The system of any of paragraphs A6-A6.1, wherein the first-section length is in the range of 0.2-1, 0.2-0.8, 0.2-0.6, 0.2-0.4, 0.4-1, 0.4-0.8, 0.4-0.6, 0.6-1, 0.6-0.8, or 0.8-1 meters and the second-section length is in the range 0.4-2, 0.4-1.6, 0.4-1.2, 0.4-0.8, 0.8-2, 0.8-1.6, 0.8-1.2, 1.2-2, 1.2-1.6, or 1.6-2 meters, respectively.

A7 The system of any of paragraphs A-A6.3, wherein the bed sections are configured such that when a selection of the plurality of bed sections are assembled to define the linear machine-tool bed, the linear machine-tool bed has a generally rectangular plan profile.

A8 The system of any of paragraphs A-A7, wherein the bed sections are configured to be coupled operatively together to selectively define the linear machine-tool bed in the form of (i) a single bed for use with a machine-tool ram (or beam) in a cantilever configuration and (ii) two spaced-apart beds for use with a machine-tool ram (or beam) in a gantry configuration.

A8.1 The system of paragraph A8 when depending from paragraph A5, wherein the two spaced-apart beds correspond to the two longitudinally parallel, laterally adjacent bed portions.

A8.2 The system of any of paragraphs A8-A8.1 when depending from paragraph A5, wherein the bed sections are configured so that when the linear machine-tool bed is assembled to form a single bed for use with a machine-tool ram in a cantilever configuration, the two longitudinally parallel, laterally adjacent bed portions are coupled operatively together directly adjacent to each other; and wherein the bed sections are configured so that when the linear machine-tool bed is assembled to form two spaced-apart beds for use with a machine-tool ram in a gantry configuration, the two longitudinally parallel, laterally adjacent bed portions are spaced-apart from each other.

A8.3 The system of any of paragraphs A8-A8.2, wherein at least one of the two spaced-apart beds for use with a machine-tool ram in a gantry configuration includes at least two bed sections configured to be coupled operatively and longitudinally together, the system further comprising:

at least one gantry alignment tool configured to be coupled operatively to longitudinally adjacent bed sections of the at least one of the two spaced-apart beds to align longitudinally adjacent bed sections during assembly of the linear machine-tool bed in the form of two spaced-apart beds so that the straight track is defined.

A8.4 The system of any of paragraphs A8-A8.2, wherein the two spaced-apart beds for use with a machine-tool ram in a gantry configuration each includes at least two bed sections configured to be coupled longitudinally together, the system further comprising:

at least two gantry alignment tools configured to be coupled operatively to longitudinally adjacent bed sections of each of the two spaced-apart beds to align longitudinally adjacent bed sections during assembly of the linear machine-tool bed in the form of two-spaced apart beds so that the straight track is defined.

A9 The system of any of paragraphs A-A8.4, further comprising:

a ram-carriage (or skate) configured to be coupled operatively to and for selective translation longitudinally along the straight track;

a ram-carriage drive mechanism configured to be coupled operatively between the linear machine-tool bed and the ram-carriage when assembled for selectively translating the ram-carriage longitudinally along the straight track; and at least one ram (or beam) configured to be coupled operatively to the ram-carriage and to carry a tool for working a work piece.

A9.1 The system of paragraph A9, further comprising:

a tool drive mechanism either configured to be coupled operatively between the ram and a tool for selectively translating the tool longitudinally along the ram and perpendicular to a longitudinal axis of the linear machine-tool bed.

A9.2 The system of any of paragraphs A9-A9.1, wherein the bed sections each include a section of linear track (or rail) that is configured to be aligned linearly with each other to define the straight track when the linear machine-tool bed is assembled, and wherein the ram-carriage includes at least one corresponding receiver (or rail block) configured to mate with the linear tracks for selective translation longitudinally therealong when the linear machine-tool bed is assembled.

A9.2.1 The system of paragraph A9.2 when depending from paragraph A5, wherein the ram-carriage includes two corresponding receivers configured to mate with the linear tracks of the two longitudinally parallel, laterally adjacent bed portions for selective translation longitudinally thereal-ong when the linear machine-tool bed is assembled.

A9.2.1.1 The system of paragraph A9.2.1 when depending from paragraph A8, wherein the ram-carriage is configured to be separated selectively into two ram-carriage portions with each ram-carriage portion being configured to mate with the linear tracks of the respective bed sections of the two spaced-apart beds when configured in a gantry configuration, and with the two ram-carriage portions being further configured to be coupled operatively and selectively together into a single ram-carriage portion configured to mate with the linear tracks of the respective bed sections of the single bed for use with a machine-tool ram in a cantilever configuration.

A9.3 The system of any of paragraphs A9-A9.2.1.1, wherein the tool includes a cutting tool, mill, drill, grinder, sander, polisher, saw, cutter, router, planer, or other tool.

A9.4 The system of any of paragraphs A9-A9.3 when depending from paragraph A8, wherein the at least one ram includes a first ram having a first-ram length and a second ram having a second-ram length that is greater than the first-ram length.

A9.4.1 The system of paragraph A9.4, wherein the first ram is configured to be used in the cantilever configuration.

A9.4.1.1 The system of paragraph A9.4.1, wherein the first ram is configured to restrict deflection of the first ram relative to the linear machine-tool bed to an acceptable amount to permit acceptable precision of working a work piece with a tool carried by the first ram when the linear machine-tool bed is assembled together with the ram-carriage, the first ram, and the tool.

A9.4.2 The system of any of paragraphs A9.4-A9.4.1.1, wherein the first-ram length is in the range of 0.3-1.5, 0.3-1.1, 0.3-0.7, 0.7-1.5, 0.7-1.1, or 1.1-1.5 meters.

A9.4.3 The system of any of paragraphs A9.4-A9.4.2, wherein the second-ram length is in the range of 1-3, 1-2.5, 1-2, 1-1.5, 1.5-3, 1.5-2.5, 1.5-2, 2-3, 2-2.5, or 2.5-3 meters.

A10 The system of any of paragraphs A-A9.4.3, wherein the bed sections each have a section width in the range of 0.1-0.5, 0.1-0.4, 0.1-0.3, 0.1-0.2, 0.2-0.5, 0.2-0.4, 0.2-0.3, 0.3-0.5, 0.3-0.5, or 0.4-0.5 meters.

A11 The system of any of paragraphs A-A10, wherein the bed sections each have a section length in the range of 0.2-2 meters.

A12 A modular linear machine-tool bed, comprising:

a selection of bed sections from the plurality of bed sections from the system of any of paragraphs A-A11, wherein the selection of bed sections are coupled operatively together to define the straight track for longitudinal translation of an associated tool relative to the linear machine-tool bed.

A12.1 The modular linear machine-tool bed of paragraph A12, wherein the selection of bed sections from the plurality of bed sections are coupled operatively together to define two longitudinally parallel, laterally adjacent bed portions that are coupled operatively together.

A12.1.1 The modular linear machine-tool bed of paragraph A12.1, wherein joints between longitudinally adjacent bed sections of one bed portion do not align with joints between longitudinally adjacent bed sections of the other bed portion.

A12.1.2 The modular linear machine-tool bed of any of paragraphs A12.1-A12.1.1, wherein laterally adjacent bed sections are longitudinally staggered.

A12.1.3 The modular linear machine-tool bed of any of paragraphs A12.1-A12.1.2, wherein the selection of bed sections includes at least two bed sections having a first-section length and at least one bed section having a second-section length that is twice the first-section length.

A12.1.3.1 The modular linear machine-tool bed of paragraph A12.1.3, wherein the selection of bed sections consists of two bed sections having the first-section length and includes one or more bed sections having the second-section length.

A12.1.3.1.1 The modular linear machine-tool bed of paragraph A12.1.3.1, wherein the selection of bed sections includes at least two bed sections having the second-section length.

A12.2 The modular linear machine-tool bed of any of paragraphs A12-A12.1.3.1.1, wherein the modular linear machine-tool bed has a generally rectangular plan profile.

A12.3 The modular linear machine-tool bed of paragraph A12 when depending from paragraph A8, wherein the selection of bed sections from the plurality of bed sections are coupled operatively together to define two spaced-apart beds for use with a machine-tool ram in a gantry configuration.

A12.3.1 The modular linear machine-tool bed of paragraph A12.3, wherein at least one of the two spaced-apart beds includes two longitudinally adjacent bed sections, the modular linear machine-tool bed further comprising:

at least one gantry alignment tool coupled operatively to the longitudinally adjacent bed sections.

A12.3.2 The modular linear machine-tool bed of paragraph A12.3, wherein the two spaced-apart beds for use with a machine-tool ram in a gantry configuration each includes at least two longitudinally adjacent bed sections, the modular linear machine-tool bed further comprising:

at least two gantry alignment tools coupled operatively to the longitudinally adjacent bed sections of each of the two spaced-apart beds.

A13 A modular machine-tool, comprising:

the modular linear machine-tool bed of any of paragraphs A12.1-A12.3.2;

a ram-carriage (or skate) operatively coupled to the modular linear machine-tool bed for selective translation longitudinally along the straight track; and a ram (or beam) operatively coupled to the ram-carriage for carrying a tool for working a work piece.

A14 A modular machine-tool, comprising:

the modular linear machine-tool bed of any of paragraphs A12.3-A12.3.2, wherein each bed of the two spaced-apart beds defines a linear track;

two ram-carriage (or skate) portions, each ram-carriage portion operatively coupled with a respective linear track of the two spaced-apart beds; and a ram (or beam) operatively coupled to and extending between the two ram-carriage portions for carrying a tool for working a work piece.

B A modular machine tool having a cantilever configuration and a gantry (or bridge) configuration, comprising:

a modular linear machine-tool bed that defines a straight track for longitudinal translation of an associated tool relative to the modular linear machine-tool bed, wherein the modular linear machine-tool bed includes two longitudinally parallel portions, wherein when the modular machine tool is in the cantilever configuration, the two longitudinally parallel portions are coupled operatively together laterally adjacent each other, and wherein when the modular machine tool is in the gantry configuration, the two longitudinally parallel portions are spaced apart from each other;

a modular ram-carriage (or skate) including two ram-carriage portions operatively coupled respectively to the two longitudinally parallel portions for selective translation longitudinally along the straight track; and at least one ram (or beam), wherein one of the at least one ram is operatively coupled to the modular ram-carriage for carrying a tool for working a work piece, wherein when the modular machine tool is in the gantry configuration, the one of the at least one ram extends between the two ram-carriage portions.

B1 The modular machine tool of paragraph B, wherein the modular linear machine-tool bed is rigid.

B2 The modular machine tool of any of paragraphs B-B1, wherein the modular linear machine-tool bed is configured to not flex (or bend) significantly.

B3 The modular machine tool of any of paragraphs B-B2, wherein the modular linear machine-tool bed is constructed substantially of at least one of steel and ductile iron.

B4 The modular machine tool of any of paragraphs B-B3, wherein the modular linear machine-tool bed includes at least three bed sections, wherein at least one of the two longitudinally parallel portions includes at least two of the bed sections operatively and longitudinally coupled together.

B4.1 The modular machine tool of paragraph B4, wherein the bed sections each have a section length in the range of 0.2-2 meters.

B5 The modular machine tool of any of paragraphs B-B4.1, wherein the modular linear machine-tool bed includes at least four bed sections, wherein each of the two longitudinally parallel portions includes at least two of the bed sections operatively and longitudinally coupled together.

B5.1 The modular machine tool of paragraph B5, wherein joints between two longitudinally adjacent bed sections of one bed portion do not align with joints between longitudinally adjacent bed sections of the other bed portion.

B5.2 The modular machine tool of any of paragraphs B5-B5.1, wherein laterally adjacent bed sections are longitudinally staggered.

B6 The modular machine tool of any of paragraphs B4-B5.2, wherein the bed sections include a first subset of bed sections having a first-section length and a second subset of bed sections having a second-section length that is greater than the first-section length.

B6.1 The modular machine tool of paragraph B6, wherein the second-section length is (or is approximately) twice the first-section length.

B6.2 The modular machine tool of any of paragraphs B6-B6.1, wherein the first subset of bed sections includes at least two bed sections and the second subset of bed sections includes at least one bed section.

B6.3 The modular machine tool of any of paragraphs B6-B6.2, wherein the first-section length is in the range of 0.2-1, 0.2-0.8, 0.2-0.6, 0.2-0.4, 0.4-1, 0.4-0.8, 0.4-0.6, 0.6-1, 0.6-0.8, or 0.8-1 meters and the second-section length is in the range of 0.4-2, 0.4-1.6, 0.4-1.2, 0.4-0.8, 0.8-2, 0.8-1.6, 0.8-1.2, 1.2-2, 1.2-1.6, or 1.6-2 meters, respectively.

B7 The modular machine tool of any of paragraphs B-B6.3, wherein the modular linear machine-tool bed has a generally rectangular plan profile.

B8 The modular machine tool of any of paragraphs B4-B7, wherein when the machine tool is in the gantry configuration, the machine tool further comprises:

at least one gantry alignment tool operatively coupled to longitudinally adjacent bed sections of at least one of the two longitudinally parallel portions, wherein the at least one gantry alignment tool is configured to align the longitudinally adjacent bed sections during assembly of the modular linear machine-tool bed so that the straight track is defined.

B9 The modular machine tool of any of paragraphs B4-B7, wherein each of the two longitudinally parallel portions includes at least two bed sections operatively and longitudinally coupled together, and wherein when the machine tool is in the gantry configuration, the machine tool further comprises:

at least two gantry alignment tools operatively and respectively coupled to longitudinally adjacent bed sections of the two longitudinally parallel portions, wherein the at least two gantry alignment tools are configured to align the longitudinally adjacent bed sections during assembly of the modular linear machine-tool bed so that the straight track is defined.

B10 The modular machine tool of any of paragraphs B-B9, further comprising:

a ram-carriage drive mechanism at least partially and operatively coupled to at least one of the two longitudinally parallel portions of the modular linear machine-tool bed, wherein the ram-carriage drive mechanism is configured to selectively translate the modular ram-carriage longitudinally along the straight track.

B11 The modular machine tool of any of paragraphs B-B10, further comprising:

a tool-carriage operatively coupled to the ram for selective translation longitudinally along the one of the at least one ram, wherein the tool-carriage is configured to operatively carry a tool; and a tool-carriage drive mechanism operatively coupled between the one of the at least one ram and the tool-carriage, wherein the tool-carriage drive mechanism is configured to selectively translate the tool-carriage longitudinally along the one of the at least one ram and perpendicular to a longitudinal axis of the modular linear machine-tool bed.

B12 The modular machine tool of any of paragraphs B-B11, further comprising:
a tool operatively coupled to the tool-carriage, wherein the tool includes a cutting tool, mill, drill, grinder, sander, polisher, saw, cutter, router, planer, or other tool.

B13 The modular machine tool of any of paragraphs B-B13, wherein the at least one ram includes a first ram having a first-ram length and a second ram having a second-ram length greater than the first-ram length, and wherein when the machine tool is in the cantilever configuration, the first ram is coupled operatively to the modular ram-carriage and the second ram is not coupled to the modular ram-carriage, and wherein when the modular machine tool is in the gantry configuration, the second ram is coupled operatively to the modular ram-carriage and extends between the two ram-carriage portions and the first ram is not coupled to the modular ram-carriage.

B13.1 The modular machine tool of paragraphs B13, wherein the first ram is configured to restrict deflection of the first ram relative to the modular linear machine-tool bed to an acceptable amount to permit acceptable precision of working a work piece with a tool operatively carried by the first ram.

B13.2 The modular machine tool of any of paragraphs B13-B13.1, wherein the first-ram length is in the range of 0.3-1.5, 0.3-1.1, 0.3-0.7, 0.7-1.5, 0.7-1.1, or 1.1-1.5 meters.

B13.3 The modular machine tool of any of paragraphs B13-B13.2, wherein the second-ram length is in the range of 1-3, 1-2.5, 1-2, 1-1.5, 1.5-3, 1.5-2.5, 1.5-2, 2-3, 2-2.5, or 2.5-3 meters.

B14 The modular machine tool of any of paragraphs B-B13.3, wherein the modular linear machine-tool bed has a width in the range of 0.2-1, 0.2-0.8, 0.2-0.6, 0.2-0.4, 0.4-1, 0.4-0.8, 0.4-0.6, 0.6-1, 0.6-0.8, or 0.8-1 meters.

B15 The modular machine tool of any of paragraphs B-B14, wherein the modular linear machine-tool bed has a bed length in the range of 1-6, 1-5, 1-4, 1-3, 1-2, 2-6, 2-5, 2-4, 2-3, 3-6, 3-5, 3-4, 4-6, 4-5, and 4-6 meters.

B16 The modular machine tool of any of paragraphs B-B15 constructed (or assembled) from the system of any of paragraphs A-A11.

C A modular machine tool, comprising:
a modular linear machine-tool bed that defines a straight track for longitudinal translation of an associated tool relative to the modular linear machine-tool bed, wherein the modular linear machine-tool bed includes a plurality of bed sections operatively coupled together and that define two longitudinally parallel portions, wherein the plurality of bed sections includes at least three bed sections, wherein at least one of the two longitudinally parallel portions includes at least two of the bed sections operatively and longitudinally coupled together;
a ram-carriage (or skate) operatively coupled to the modular linear machine-tool bed for selective translation longitudinally along the straight track; and
a ram (or beam) operatively coupled to the ram-carriage for operatively carrying a tool for working a work piece.

C1 The modular machine tool of paragraph C, wherein the modular linear machine-tool bed is rigid.

C2 The modular machine tool of any of paragraphs C-C1, wherein the modular linear machine-tool bed is configured to not flex (or bend) significantly.

C3 The modular machine tool of any of paragraphs C-C2, wherein the modular linear machine-tool bed is constructed substantially of at least one of steel and ductile iron.

C4 The modular machine tool of any of paragraphs C-C3, wherein the plurality of bed sections includes at least four bed sections, wherein each of the two longitudinally parallel portions includes at least two of the bed sections operatively and longitudinally coupled together.

C4.1 The modular machine tool of paragraph C4, wherein joints between two longitudinally adjacent bed sections of one bed portion do not align with joints between longitudinally adjacent bed sections of the other bed portion.

C4.2 The modular machine tool of any of paragraphs C4-C4.1, wherein laterally adjacent bed sections are longitudinally staggered.

C5 The modular machine tool of any of paragraphs C-C4.2, wherein the plurality of bed sections includes a first subset of bed sections having a first-section length and a second subset of bed sections having a second-section length that is greater than the first-section length.

C5.1 The modular machine tool of paragraph C5, wherein the second-section length is (or is approximately) twice the first-section length.

C5.2 The modular machine tool of any of paragraphs C5-C5.1, wherein the first subset of bed sections includes at least two bed sections and the second subset of bed sections includes at least one bed section.

C5.3 The modular machine tool of any of paragraphs C5-C5.2, wherein the first-section length is in the range of 0.2-1, 0.2-0.8, 0.2-0.6, 0.2-0.4, 0.4-1, 0.4-0.8, 0.4-0.6, 0.6-1, 0.6-0.8, or 0.8-1 meters and the second-section length is in the range of 0.4-2, 0.4-1.6, 0.4-1.2, 0.4-0.8, 0.8-2, 0.8-1.6, 0.8-1.2, 1.2-2, 1.2-1.6, or 1.6-2 meters.

C6 The modular machine tool of any of paragraphs C-C5.3, wherein the modular linear machine-tool bed has a generally rectangular plan profile.

C7 The modular machine tool of any of paragraphs C-C6, further comprising:
a ram-carriage drive mechanism operatively coupled between the modular linear machine-tool bed and the ram, wherein the ram-carriage drive mechanism is configured to selectively translate the ram-carriage longitudinally along the straight track.

C8 The modular machine tool of any of paragraphs C-C7, further comprising:
a tool-carriage operatively coupled to the ram for selective translation longitudinally along the ram, wherein the tool-carriage is configured to operative carry a tool; and
a tool-carriage drive mechanism operatively coupled between the ram and the tool-carriage, wherein the tool-carriage drive mechanism is configured to selectively translate the tool-carriage longitudinally along the ram and perpendicular to a longitudinal axis of the modular linear machine-tool bed.

C9 The modular machine tool of any of paragraphs C-C8, further comprising:
a tool operatively coupled to the tool-carriage, wherein the tool includes a cutting tool, mill, drill, grinder, sander, polisher, saw, cutter, router, planer, or other tool.

C10 The modular machine tool of any of paragraphs C-C9, wherein the modular linear machine-tool bed has a width in the range of 0.2-1, 0.2-0.8, 0.2-0.6, 0.2-0.4, 0.4-1, 0.4-0.8, 0.4-0.6, 0.6-1, 0.6-0.8, or 0.8-1 meters.

C11 The modular machine tool of any of paragraphs C-C10, wherein the modular linear machine-tool bed has a bed length in the range of 1-6, 1-5, 1-4, 1-3, 1-2, 2-6, 2-5, 2-4, 2-3, 3-6, 3-5, 3-4, 4-6, 4-5, and 4-6 meters.

C12 The modular machine tool of any of paragraphs C-C11, wherein the modular machine tool is configured to have a cantilever configuration and a gantry configuration, wherein when the machine tool is in the cantilever configuration, the two longitudinally parallel portions are coupled operatively together laterally adjacent each other, and wherein when the machine tool is in the gantry configuration, the two longitudinally parallel portions are spaced apart from each other.

C13 The modular machine tool of any of paragraphs C-C12 constructed (or assembled) from the system of any of paragraphs A-A11.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A modular machine-tool system, comprising:
a plurality of rigid bed sections configured to be coupled operatively and selectively together to define a linear machine-tool bed having a longitudinal bed axis, wherein the rigid bed sections are configured to define a straight track, wherein the plurality of rigid bed sections each have a longitudinal section axis, wherein the plurality of rigid bed sections include at least two bed sections configured to be operatively and selectively coupled together coaxially with respect to their longitudinal section axes, and wherein the rigid bed sections are configured to be coupled operatively and selectively together to define two adjacent bed portions laterally relative to the respective longitudinal section axes and parallel to the longitudinal bed axis;
a ram-carriage configured to be coupled operatively to the linear machine-tool bed for selective translation along the longitudinal bed axis;
a ram-carriage drive mechanism configured to be coupled operatively between the linear machine-tool bed and the ram-carriage for selectively translating the ram-carriage along the linear machine-tool bed along the longitudinal bed axis; and
at least one ram configured to be coupled operatively to the ram-carriage and to carry an associated tool for working a work piece;
wherein the rigid bed sections are configured to be coupled operatively together to selectively define the linear machine-tool bed in the form of (i) a single bed for use with the at least one ram in a cantilever configuration and (ii) two spaced-apart beds for use with the at least one ram in a gantry configuration;
wherein the ram-carriage includes two corresponding receivers configured to mate with the two adjacent bed portions for selective translation therealong; and
wherein the ram-carriage is configured to be separated selectively into two ram-carriage portions with each ram-carriage portion being configured to mate with the respective bed sections of the two spaced-apart beds for use with the at least one ram in the gantry configuration, and with the two ram-carriage portions being further configured to be coupled operatively and selectively together into a single ram-carriage portion configured to mate with the respective bed sections of the single bed for use with the at least one ram in the cantilever configuration.

2. The system of claim 1, further comprising:
a tool drive mechanism configured to be coupled operatively between the at least one ram and the associated tool for selectively translating the associated tool along the at least one ram and perpendicular to the longitudinal axis of the linear machine-tool bed.

3. The system of claim 1, wherein the at least one ram includes a first ram having a first-ram length and a second ram having a second-ram length that is greater than the first-ram length.

4. The system of claim 3, wherein the first ram is configured to be used in the cantilever configuration, and wherein the second ram is configured to be used in the gantry configuration.

5. The system of claim 1 assembled to define a machine tool in the cantilever configuration, the machine tool comprising:
a selection of bed sections from the plurality of rigid bed sections, wherein the selection of bed sections are coupled operatively together to define the straight track, and wherein the selection of bed sections are coupled operatively together to define the two adjacent bed portions coupled operatively together laterally relative to the respective longitudinal section axes and parallel to the longitudinal bed axis;
wherein the ram-carriage is operatively coupled to the linear machine-tool bed for selective translation along the longitudinal bed axis; and
wherein the at least one ram is operatively coupled to the ram-carriage for carrying the associated tool for working the work piece.

6. The system of claim 1 assembled to define a machine tool in the gantry configuration, the machine tool comprising:

a selection of bed sections from the plurality of rigid bed sections, wherein the selection of bed sections are coupled operatively together to define the straight track, and wherein the selection of bed sections are coupled operatively together to define the two spaced-apart beds;
wherein each ram-carriage portion is operatively coupled with a respective one of the two spaced-apart beds; and
wherein the at least one ram is operatively coupled to and extends between the two ram-carriage portions for carrying the associated tool for working the work piece.

7. The system of claim 1, wherein the rigid bed sections are configured to be coupled operatively and selectively together to define collectively a desired length of the linear machine-tool bed from a selection of more than one possible length.

8. The system of claim 1, wherein the rigid bed sections are configured to be coupled operatively and selectively together so that joints between longitudinally coaxial adjacent bed sections of one of the two adjacent bed portions do not align with joints between longitudinally coaxial adjacent bed sections of the other of the two adjacent bed portions.

9. The system of claim 1, further comprising:
an alignment tool configured to be coupled operatively, selectively, and temporarily to both of the two adjacent bed portions to align the two adjacent bed portions during assembly of the linear machine-tool bed so that the straight track is defined.

10. The system of claim 1, wherein the plurality of rigid bed sections includes a first subset of bed sections having a first-section length and a second subset of bed sections having a second-section length that is twice the first-section length.

11. The system claim 1, wherein at least one of the two spaced-apart beds for use with the at least one ram in the gantry configuration includes at least two bed sections configured to be operatively and selectively coupled together coaxially with respect to their longitudinal section axes, the system further comprising:
at least one gantry alignment tool configured to be coupled selectively and operatively to longitudinally coaxial adjacent bed sections of the at least one of the two spaced-apart beds to align the longitudinally coaxial adjacent bed sections during assembly of the linear machine-tool bed in the form of the two spaced-apart beds so that the straight track is defined.

\* \* \* \* \*